Mar. 20, 1923.

J. B. DAVIS.
QUANTITY STOP FOR MEASURING PUMPS.
FILED MAY 20, 1921.

INVENTOR
John B. Davis
BY
ATTORNEYS

Mar. 20, 1923.

J. B. DAVIS.
QUANTITY STOP FOR MEASURING PUMPS.
FILED MAY 20, 1921.

INVENTOR
John B. Davis.
BY
ATTORNEYS

Patented Mar. 20, 1923.

1,449,218

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

QUANTITY STOP FOR MEASURING PUMPS.

Application filed May 20, 1921. Serial No. 471,103.

*To all whom it may concern:*

Be it known that I, JOHN B. DAVIS, citizen of the United States, residing at Springfield, in the county of Hampden and State of Massachusetts, have invented new and useful Improvements in Quantity Stops for Measuring Pumps, of which the following is a specification.

The present invention relates to measuring or dispensing pumps of the reciprocatory type such as are used for the dispensation of gasoline and like oils. More particularly, the invention relates to quantity stops for such pumps for predetermining the amount of oil delivered thereby.

It is common to provide measuring pumps with a series of quantity stops adapted to be selectively positioned to limit, in different degrees, the stroke of the pump piston or a member reciprocable therewith and thus to enable the pump to deliver different predetermined quantities of liquid. Such stops frequently consist of fingers which project at different elevations and in different radial positions from a vertical rod or shaft which is adapted to be turned to position one or another of the stop fingers in the path of the upwardly-moving pump piston or other reciprocable member connected therewith. These stop fingers are engaged at their free extremities, and often with considerable force, by the piston or other member, and as a result of the impact are liable to spring or yield upwardly to some extent. Inasmuch as the cylinders of pumps of this type are usually of large cross-sectional area, the slightest degree of yielding displacement of the stop fingers by reason of the lifting effect of the piston will cause a considerable error in the amount of liquid delivered.

One of the objects of the present invention is to provide, in a dispensing pump of the reciprocable-piston type, one or more quantity stops adapted to be moved into position to limit the stroke of the pump piston and, when thus operatively positioned, to be absolutely rigid and unyielding in the direction of said stroke.

Other objects of the invention and the features of construction by which they are attained will be apparent from the following description of the preferred embodiment thereof, illustrated in the accompanying drawings, in which—

Fig. 4 is a side elevational view of the part of the pump mechanism shown in Fig. 1 which cooperates with the quantity stops.

Figure 1:
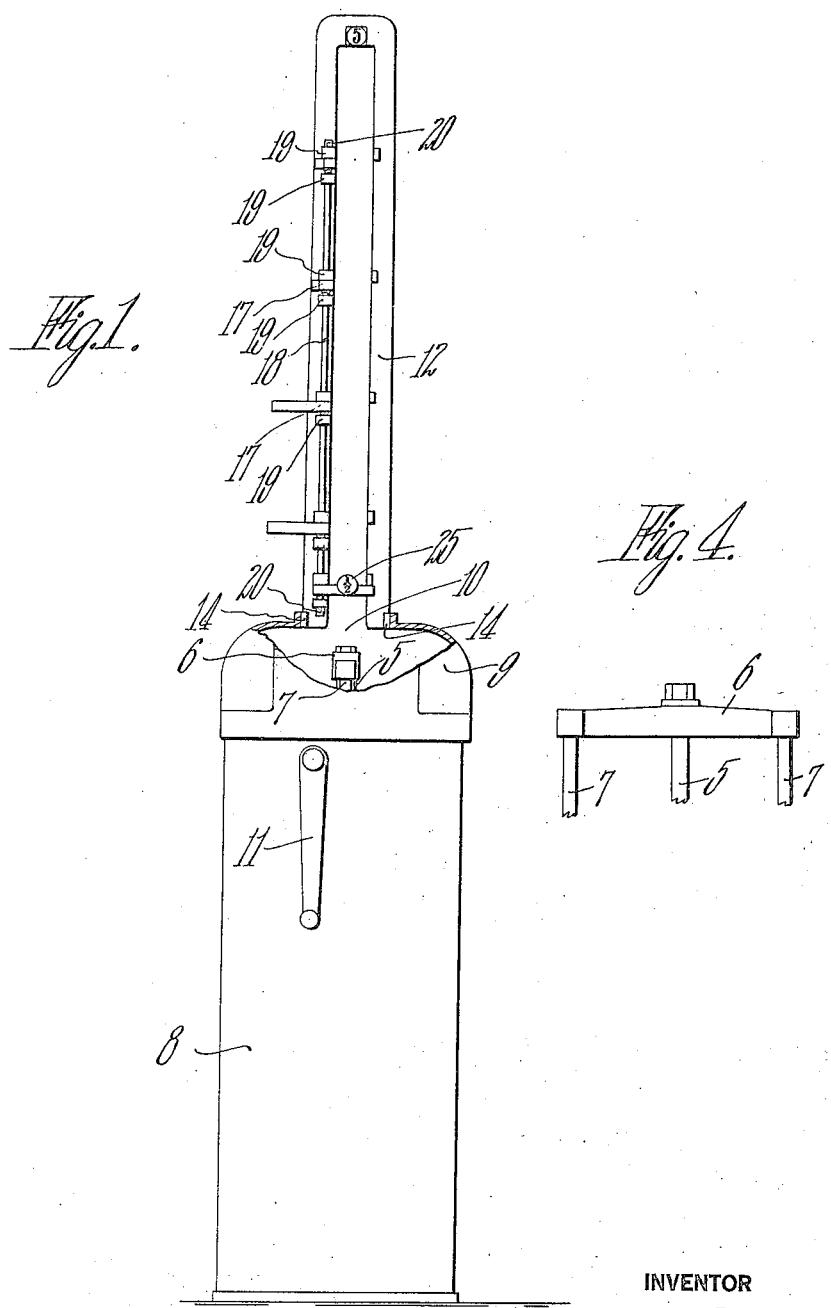
Fig. 1 is a view, in front elevation, of a dispensing pump equipped with a plurality of quantity stops constructed in accordance with the present invention, one of said stops being shown in operative position and a portion of the pump casing being broken away to show that part of the pump mechanism which co-operates with said stops.
Figure 2:
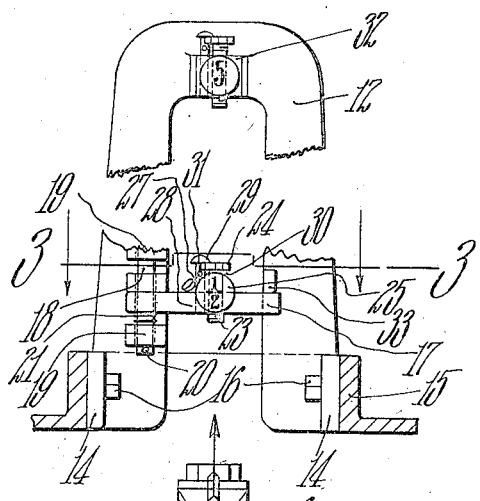
Fig. 2 is a detailed view, in front elevation and on an enlarged scale, of a portion of the apparatus shown in Fig. 1.

With the exception of the devices constituting the preferred embodiment of the present invention, the pump illustrated in Fig. 1 of the drawings is similar in construction to the pump illustrated and described in Letters Patent of the United States No. 1,302,014, granted April 29, 1919, to the present applicant and assigned to Gilbert & Barker Manufacturing Company. The illustrated pump, in common with the pump of the patent referred to, is provided with the usual pump cylinder and piston (not shown); a piston-rod, the upper end of which is indicated at 5; a cross-head 6 carried by the piston-rod; piston-actuating mechanism, including a pair of vertical operating rods 7 which are connected to the opposite ends of the cross-head 6; a casing enclosing said parts and comprising a cylindrical body portion 8 and a cover 9, the latter having a central elliptical opening 10 for the passage therethrough of the cross-head 6; and a crank or handle 11 upon the exterior of the pump casing for operating the piston-actuating mechanism. The parts of the actuating mechanism above described are substantially the same in construction and operate in the same manner as that of corresponding parts of the machine of the above-named patent. For a complete disclosure of the construction and mode of operation of these parts, reference may be had to said patent.

Figure 3:
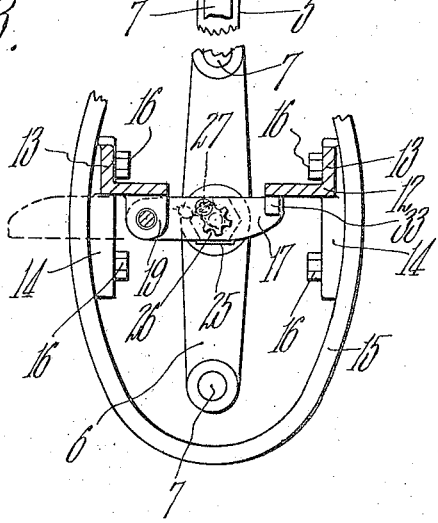
Fig. 3 is a sectional view taken on the line 3—3 of Fig. 1.

The quantity stops embodying the features of the present invention are mounted one above another, upon a standard 12 which rises vertically from the casing cover 9. The standard 12 consists of an elongated yoke or inverted U-shaped casting provided with a marginal strengthening rib, indicated in cross-section at 13 in Fig. 3. The legs of the standard 12 are provided, at their lower extremities, with laterally-projecting ears 14, the outwardly-directed faces of which are curved to conform to the curvature of the inner sides of a flange 15 such as is usually formed upon the casing cover 9 surrounding the elliptical opening 10 therein. The standard 12 is rigidly secured to the casing cover 9 by means of bolts 16 which extend through the ears 14 and are threaded into the cover flange 15. The opposite legs of the standard 12 lie in a vertical plane perpendicular to the length of the cross-head 6 and their arrangement is such that the cross-head will travel between them as the pump piston reciprocates.

The quantity stops comprise a plurality of fingers 17, all of which are pivotally mounted at one end upon a single vertical rod 18 that is supported immediately in front of one leg of the standard 12. The means for supporting the rod 18 comprises a plurality of ears 19 projecting from the front of the standard 12 and having axially alined apertures through which the rod extends. Transverse cotter-pins 20 are provided at the opposite ends of the rod 18, and these pins engage, respectively, the uppermost and lowermost of the ears 19 to prevent longitudinal displacement of the rod 18.

The ears 19 are arranged in pairs separated by distances somewhat greater than the thickness of the stop-fingers 17, and the latter are severally mounted between the individual members of each pair of ears. Each stop-finger is yieldingly maintained in contact with the ears 19 immediately above it by means of a spring 21 which is coiled around the pivot-rod 18 between the stop finger and the ear 19 immediately beneath the finger. The several springs 21 frictionally resist the turning of the stop-fingers 17 with sufficient force to insure that each stop-finger will be maintained in any radial position upon the rod to which it may be adjusted.

When the apparatus is not in use, all of the stop-fingers 17 are frictionally held in their inoperative positions, as indicated in Fig. 1, by the positions of the four upper stop-fingers. The stop-fingers are severally adapted to be swung to bring their free extremities into engagement with the opposite leg of the standard 12 from that upon which they are pivotally mounted. When a selected stop-finger has been positioned, it extends across the path of movement of the cross-head 6 directly above the central portion thereof. It will be seen that the leg of the standard 12 which is engaged by the free extremities of the stop-fingers performs the function of locating the fingers uniformly in their operative positions. Any stop-finger thus operatively positioned is adapted to limit the upward movement of the cross-head 6, and, therefore, of the pump piston, and thus to determine the amount of oil delivered by the pump.

In order that the quantity of oil delivered shall be measured with exactness in units, such as gallons, each stop-finger 17 carries a stop-screw 23 which is threaded vertically through the finger at such a point as to be directly above the central portion of the cross-head 6 when the finger 16 is operatively positioned. The lower extremities of the stop-screws 23 thus constitute the limiting stops for determining the stroke of the pump piston. By turning the stop-screws 23 a very fine adjustment of the elevation of the limiting stops may be secured, thus insuring the arrest of the cross-head 6 and the piston at the proper points to accurately measure the quantity of oil to be delivered. The stop-screws 23 are provided with heads 24 by means of which they may be conveniently adjusted. Each stop-finger 17 has secured thereto a tag 25 upon which may be placed a numeral indicating, in gallons or otherwise, the quantity of oil which the pump will deliver when that particular stop-finger has been swung into operative position.

To prevent accidental turning of the stop-screws 23 after they have been properly adjusted, the following provision is made. The heads 24 of the stop-screws are provided with a plurality of spaced peripheral notches, indicated at 26 in Fig. 3, and a locking-pin 27 is provided which is adapted to co-operate with said notches to prevent turning in either direction of the stop-screw. To receive and support the locking-pin 27, the stop-finger 17 is drilled to provide an aperture 28 so located that one of the notches 26 in the head of the stop-screw may be radially positioned with its curved edge in vertical alinement with a portion of the wall of said aperture. Thus, when the locking-pin has been placed in co-operative engagement with said notch, the lower extremity of the locking-pin may be inserted into the aperture 28 and the stop-screw 23 thereby locked against turning.

To prevent unwarranted interference with the adjustment of the stop-screw 23, provision is made for preventing the locking-pin 27 from being withdrawn from the aperture in the stop-finger 17. To this end, the locking-pin 27 is provided with a head 29 adapted to overlie the head of the stop-screw 23 when the locking-pin has been placed in operative position. The locking-pin may be prevented from being lifted from the aperture 28 by means of a wire 30 which may be passed through a transverse opening 31 in the shank of the locking-pin and wrapped around the shank of the stop-screw 23 just beneath the head of the latter, the free ends of said wire being connected by a suitable seal.

A stop-screw, similar to those already described, may be threaded through a lug 32 at the top of the standard 12 to co-operate with the crosshead 6 to determine the maximum stroke of the pump piston. As shown, a suitably indexed tag 25 may be associated with said stop-screw, and means similar to that above described, for locking the stop-screw in adjusted position may be employed.

The use of the adjustable stop-screws 23 in connection with the stop-fingers 17 permits the portion of the quantity stop actually engaged by the cross-head or other reciprocating part of the pump to be readily adjusted to compensate for slight inaccuracies of manufacture. Thus it is not necessary to exercise extreme care or accuracy in the manufacture or assembling of the component parts of the quantity stop apparatus in order to insure exact measurements, in gallons or other units, of oil.

To prevent inaccuracy of measurement, due to yielding or other upward displacement of any of the stop-fingers 17 while engaged by the cross-head 6, means is provided for reinforcing the stop-fingers at their free extremities. To this end, a plurality of abutments in the form of lugs 33 are cast upon the leg of the standard 12 at the opposite side thereof from the pivot-rod 18. The reinforcing lugs 33 are severally located opposite the uppermost member of each pair of pivot-rod supporting ears 19. Thus, when any one of the stop-fingers is operatively positioned, as illustrated by the position of the lowermost stop-finger 17 in Fig. 1, said finger will be maintained in a horizontal position and will be so reinforced that upward displacement thereof by the cross-head 6 will be positively prevented.

Not only is absolute accuracy of measurement insured by the above-described construction of the quantity stops and their supporting standard, but the construction of these parts is such that the stops and the standard may be manufactured at very low cost. The standard 12, with its ears 19 and reinforcing lugs 33, may be cast in one piece. It will be obvious that the pivot rod apertures in the ears 19 may be drilled progressively at a single operation and that very little additional machine work will be necessary to prepare the standard for the assembly therewith of the stop-fingers and associated parts. It is further pointed out that standards may be readily attached to pump casings of standard construction without the necessity of any special tools or any machine work other than the boring of holes in the casing cover flange to receive the bolts 16.

While it is preferred to employ the specific construction and arrangement of parts shown and described, it is to be understood that this construction and arrangement is not essential except so far as defined in the claims and may be changed or modified without departing from the spirit and scope of the invention.

What is claimed is:

1. In a measuring pump, the combination with the pump cylinder, its piston and actuating mechanism, of a support, a quantity stop mounted on said support and movable into position to co-operate with said mechanism to limit the stroke of the piston, and means at a distance from said support for reinforcing the stop when the latter is operatively positioned to prevent displacement thereof under the influence of said mechanism.

2. In a measuring pump of the type wherein a member reciprocable with the pump piston is engageable with a movable quantity-stop intermediate its ends, stationary means on each side of the path of travel of said member adapted to be engaged by the stop when the latter is engaged by said member.

3. In a measuring pump, the combination with the pump cylinder, its piston, and a member reciprocable with the piston, of a plurality of quantity-stops any one of which may be positioned in the path of said member to limit the stroke of the piston, supporting means for the stops, and means at a distance from said supporting means for rigidly reinforcing the stops when the latter are operatively positioned to positively prevent displacement of the stops by said reciprocable member.

4. In a measuring pump, a member reciprocable with the pump piston, a standard rising from the pump body, a plurality of quantity stops pivotally mounted at different elevations on the standard and adapted to be swung into the path of said member to limit the stroke of the piston, and means on the standard for limiting the swinging movements of the stops to determine their operative positions and for reinforcing said stops to prevent upward displacement thereof by said member.

5. In a measuring pump, a member reciprocable with the pump piston, an inverted U-shaped standard rising from the pump body, a plurality of stop-fingers pivotally mounted at one end upon one leg of the standard for independent swinging movement and adapted to be positioned across the path of said member to limit the stroke of the piston, and a plurality of abutments on the other leg of said standard for reinforcing said fingers when operatively positioned to prevent upward displacement thereof by said member.

6. In a dispensing apparatus of the type having a pump cylinder, a piston, and actuating mechanism for the piston, the combination of a stop-finger, a stop-screw threaded through said finger and adapted to co-operate with said actuating mechanism to limit the stroke of the piston, an adjusting head on said screw having a series of peripheral notches therein, and a locking pin carried by said finger for engaging in one of said notches to retain the screw in adjusted position.

7. In a dispensing apparatus of the type having a pump cylinder, a piston and actuating mechanism for the piston, the combination of a stop-finger, a stop-screw threaded through said finger and adapted to co-operate with said actuating mechanism to limit the stroke of the piston, an adjusting head on said screw having a series of peripheral notches therein, a locking-pin carried by said finger for engaging any one of said notches to retain the screw in adjusted position, and sealing means for preventing removal of the locking pin.

8. In a dispensing apparatus of the type having a pump cylinder, a piston and actuating mechanism for the piston, the combination of a stop-finger, a stop-screw threaded through said finger and adapted to co-operate with said actuating mechanism to limit the stroke of the piston, an adjusting head on said screw having a series of peripheral notches therein, an aperture provided in the stop finger adjacent said screw, a locking pin adapted to extend through one of said notches and through said aperture, a head on the locking pin for engagement with the head of the stop-screw to prevent longitudinal displacement in one direction of said locking pin, and sealing means to prevent longitudinal displacement of the locking-pin in the opposite direction.

9. In a dispensing apparatus, a pump cylinder and piston, actuating mechanism for the piston, a pump casing, a frame on the casing having a plurality of pairs of ears all arranged in alinement, axially alined apertures provided in and extending through the ears, a rod extending through all the apertures, a stop finger for each pair of ears and having a part disposed therebetween and loosely mounted on said rod, each finger adapted to swing from one position in which it is effective to limit the stroke of the piston to another position in which it is ineffective so to do, and means acting between each finger and one of its pairs of ears for holding the finger against the other ear and frictionally maintaining it in either of said positions.

10. In a dispensing apparatus of the type having a pump cylinder, a piston and actuating mechanism for the piston, the combination with a casing enclosing said parts, of a standard rising from the casing, a pair of ears arranged one above the other on said standard and having vertically alined apertures extending therethrough, a rod extending through said apertures, a stop-finger pivotally mounted on said rod between said ears adapted to be moved into position to cooperate with a portion of the piston-actuating mechanism to limit the stroke of the piston, and a spring coiled around said rod between the stop-finger and the lower ear to maintain said finger in its operative and in its inoperative positions.

11. In a measuring pump of the type wherein a member reciprocable with the pump piston is engageable with a movable quantity stop which projects cantilever-fashion from a support, means engageable by the stop at a distance from said support and when operatively positioned to resist flexure of the stop when engaged by said member.

12. In a measuring pump of the type wherein a member reciprocable with the pump piston is engageable with a movable quantity-stop intermediate its ends, means loosely supporting the stop in approximately the desired operative position and permitting free movement of the stop into the exact operative position desired and also into an inoperative position out of the path of said member, stationary means on each side of the path of travel of said member adapted to be engaged by the stop when the latter is engaged by said member, and to arrest movement of the stop under the influence of said member when said stop is located in exact operative position.

In testimony whereof I have affixed my signature.

JOHN B. DAVIS.